United States Patent [19]

Singer et al.

[11] Patent Number: 6,013,733
[45] Date of Patent: Jan. 11, 2000

[54] COATING OF FILM-FORMING RESIN AND FUNCTIONAL FLOW CONTROL COPOLYMER

[75] Inventors: Debra L. Singer, Wexford; Kurt G. Olson, Gibsonia; Kurt A. Humbert, Allison Park; Karen A. Barkac, Murrysville, all of Pa.; Mark E. Wozniak, Macon, Ga.

[73] Assignee: PPG Industries Ohio, Inc., Cleveland, Ohio

[21] Appl. No.: 09/038,107

[22] Filed: Mar. 11, 1998

Related U.S. Application Data

[63] Continuation-in-part of application No. 08/921,767, Aug. 15, 1997, abandoned, which is a continuation of application No. 08/603,045, Feb. 16, 1996, abandoned.

[51] Int. Cl.[7] .............................. C08L 23/04; C08L 33/14; C08L 63/00; C08L 67/00; C08L 77/00
[52] U.S. Cl. ........................ 525/208; 525/108; 525/111; 525/113; 525/118; 525/119; 525/120; 525/121; 525/123; 525/124; 525/125; 525/161; 525/162; 525/163; 525/166; 525/170; 525/179; 525/183; 525/207; 525/213; 525/217
[58] Field of Search ..................... 525/208, 108, 525/110, 111, 113, 118, 119, 120, 121, 123, 124, 125, 161, 162, 163, 166, 170, 179, 183, 207, 213, 217

[56] References Cited

U.S. PATENT DOCUMENTS

| | | |
|---|---|---|
| Re. 32,261 | 10/1986 | Hirota et al. ............................. 525/285 |
| 3,567,692 | 3/1971 | Haggis et al. ............................ 260/75 |
| 3,726,288 | 4/1973 | Nowak et al. ............................ 132/7 |
| 3,787,340 | 1/1974 | Labana et al. ....................... 260/23 X |
| 3,927,199 | 12/1975 | Micchelli et al. ....................... 424/47 |
| 4,023,977 | 5/1977 | Mercurio et al. ...................... 106/178 |
| 4,042,645 | 8/1977 | Hirota et al. .......................... 260/830 P |
| 4,102,942 | 7/1978 | Smith et al. ........................... 260/836 |
| 4,192,929 | 3/1980 | Wingfield, Jr. ......................... 525/117 |
| 4,246,368 | 1/1981 | Murase ................................. 525/117 |
| 4,287,113 | 9/1981 | Takashina et al. ..................... 260/33.4 |
| 4,403,003 | 9/1983 | Backhouse ............................ 427/407.1 |
| 4,650,718 | 3/1987 | Simpson et al. ........................ 428/413 |
| 4,681,811 | 7/1987 | Simpson et al. ........................ 428/413 |
| 4,699,814 | 10/1987 | Ambrose et al. ..................... 427/407.1 |
| 4,703,101 | 10/1987 | Singer et al. ............................ 528/87 |
| 4,798,745 | 1/1989 | Martz et al. .......................... 427/407.1 |
| 4,801,680 | 1/1989 | Geary et al. ............................ 528/272 |
| 4,804,581 | 2/1989 | Geary et al. ............................ 428/332 |
| 4,988,767 | 1/1991 | Pettit, Jr. ............................... 525/194 |
| 5,047,259 | 9/1991 | Oberkobusch ............................. 427/27 |
| 5,202,382 | 4/1993 | Petti, Jr. ................................. 525/108 |
| 5,212,245 | 5/1993 | Franks et al. ........................... 525/223 |
| 5,219,939 | 6/1993 | Wamprecht et al. .................... 525/117 |
| 5,229,458 | 7/1993 | Schimmel et al. ...................... 525/108 |
| 5,256,452 | 10/1993 | McMonigal et al. ................ 427/407.1 |
| 5,407,707 | 4/1995 | Simeone et al. ........................ 427/410 |

FOREIGN PATENT DOCUMENTS

| | | |
|---|---|---|
| 805344 | 1/1974 | Belgium . |
| 1262596 | 10/1989 | Canada . |
| 2049837 | 3/1992 | Canada . |
| 0 355 676 | 2/1990 | European Pat. Off. . |
| 0 307 623 | 12/1991 | European Pat. Off. . |
| 0 475 108 | 3/1992 | European Pat. Off. . |
| 0 652 265 | 5/1995 | European Pat. Off. . |
| 52-69936 | 6/1977 | Japan . |
| 2-286763 | 11/1990 | Japan . |
| 3-126777 | 5/1991 | Japan . |
| 4-11673 | 1/1992 | Japan . |
| 4-114069 | 4/1992 | Japan . |
| 7-138491 | 5/1995 | Japan . |
| 7-228825 | 8/1995 | Japan . |
| 7-331165 | 12/1995 | Japan . |
| WO97/30131 | 8/1997 | WIPO . |

OTHER PUBLICATIONS

Principles of Polymer Chemistry (1953) Cornell University Press, pp. 52–57.

Primary Examiner—Robert E. Sellers
Attorney, Agent, or Firm—Kenneth J. Stachel; Anne Marie Cannoni

[57] ABSTRACT

Curable coating compositions comprising either a liquid or particulate curable film-forming resinous material, a flow control agent which is a copolymer and optionally a carrier for the liquid resinous material. The copolymer is from at least one non-amino, non-hydroxyl and non-acid functional alkyl acrylate or methacrylate containing from 1 to 20 carbon atoms in the alkyl group, and functional monomer of either (i) amino functional acrylates and methacrylates in an effective amount to give the copolymer an amine value in the range from 2 to 70, or (ii) acid functional acrylate and methacrylate in an effective amount to give the copolymer an acid value in the range of from 10 to 30. Additionally, with either functional monomer (i) or (ii) another functional comonomer (iii) can be present in the copolymer which is hydroxyalkyl acrylate and/or hydroxyalkyl methacrylate and/or caprolactone polyol monomer. Comonomer (iii) can be present in the copolymer in an effective amount to give the copolymer a hydroxyl number is in the range of about 0 to 100.

15 Claims, No Drawings

COATING OF FILM-FORMING RESIN AND FUNCTIONAL FLOW CONTROL COPOLYMER

This application is a continuation-in-part patent application of U.S. Ser. No. 08/921,767, filed Aug. 15, 1997 abandoned, which is a continuation of U.S. Ser. No. 08/603,045, filed Feb. 16, 1996 abandoned.

FIELD OF THE INVENTION

The present invention relates to curable liquid or powder coating compositions containing flow modifiers and such polymeric flow modifiers and multilayered coatings with the curable coating composition in the cured state.

BACKGROUND OF THE INVENTION

Flow or surface modifiers or control agents or additives are used in the coatings industry to control interfacial tension and surface tension gradients of coating compositions. Lower pollution-type coatings such as waterborne coatings, powder coatings, and, to some extent, high solids coatings utilize flow modifiers to control leveling of the coating film. Typical powder coating compositions contain a flow modifier to enhance their rheology or to control cratering and reduce orange-peel characteristics to provide for smoother, better looking coatings. Common flow modifiers include: acrylics such as poly(2-ethylhexyl acrylate), poly (lauryl acrylate), poly(butyl acrylate), poly(ethylacrylate-2-ethylhexylacrylate), poly(lauryl methacrylate) and the like (see in this regard U.S. Pat. No. 3,787,340 to Labana et al.). Other useful flow additives include silicon-containing polymers and fluorinated polymers, such as the esters of polyethylene glycol or polypropylene glycol, and fluorinated fatty acids.

Coating compositions used in multilayered coatings for metallic and plastic substrates like those for automotive applications must meet a number of performance requirements which can vary depending on the previous and subsequent coating layers and the application methods and chemistries for the coatings. For example, motor vehicle manufacturers who use powder coating compositions as clearcoats require a degree of compatibility between a variety of powder clearcoats from different sources. Poor compatibility can result in the powder clear coating that is applied subsequently on the manufacturing assembly line having defects from components of the powder clear coating that was previously applied on the line. Such components can act as contaminates in the subsequently applied coating, and contaminants can alter the surface tension gradients in the coating composition resulting in cratering defects.

Also in multilayered coatings on substrates, intercoat adhesion and, in some applications, recoatability can be adversely affected by modifications in the powder coatings to reduce the degree of cratering. For powder coatings applied as primer surfacers or chipguard primers or in basecoat/clearcoat composite coatings that are topcoated with typical finishing coat compositions, the presence of the aforementioned types of flow control agents can adversely affect the intercoat adhesion between the topcoat and the powder primer surfacer.

In addition, powder coatings are often applied as chipcoat primers over uncured, dehydrated electrodeposited coatings (see, for example, U.S. Pat. No. 4,804,581). In such an application, the chipguard primer is only applied to a portion of the electrodeposited coating usually in the areas that are subjected to stone chipping, i.e., rocker panels and wheel wells. The composite coating is co-cured in one step and topcoated with a conventional finishing coat. In applying the chipguard primer to only a portion of the dehydrated, uncured electrodeposited primer, there is an area of overspray where the powder coating composition contacts the electrodeposited primer in areas other than that to be coated. When the chipguard primer contains conventional flow control additives such as those described above, severe cratering of the electrodeposited primer often results. Other applications of powder coatings require recoatability, i.e., good recoat adhesion between the cured powder coating and a subsequent coating layer, so that minor imperfections or minor damage that may occur during shipment and transfer of industrial parts can be corrected. Unfortunately, powder coatings containing the common flow modifiers have been found to have poor crater resistance.

It is an object of the present invention to provide a coating composition with improved compatibility with other similar coating compositions while maintaining good appearance and intercoat adhesion.

SUMMARY OF THE INVENTION

In accordance with the present invention, a curable coating composition has:

(A) from 80 to 99.99 percent by weight based on the weight of solids of the curable coating composition of at least one liquid or particulate film-forming resinous material, and (B) from about 0.01 to 10 percent by weight based on weight of total resin solids of the curable coating composition of a flow modifying agent.

The flow modifying or control agent is an additional polymerized copolymer from polymerizable ethylenically unsaturated monomers; about 40 to 99 percent by weight based on the weight of polymerizable ethylenically unsaturated monomers for the copolymer is from at least one alkyl acrylate or methacrylate containing from 1 to 20 carbon atoms in the alkyl group which is non-amine, non-hydroxyl and non-acid functional. Also polymerized into the copolymer is at least one functional polymerizable ethylenically unsaturated monomer in an amount of about 2 to 50 percent by weight based on weight of polymerizable ethylenically unsaturated monomers for the copolymer. This functional monomer is selected from:

(1) amino functional acrylates and methacrylates in an effective amount for 100 weight percent solids in the copolymer so that the copolymer has an amine value in the range of about 2 to about 70, either present alone or with one or more hydroxyl functional monomers like hydroxyalkyl acrylates and/or methacrylates and/or polycaprolactone polyol monomers in an effective amount so that the hydroxyl number of the copolymer is up to 100, and (2) acid functional acrylates and methacrylates in an effective amount to give the copolymer an acid value in the range of from 10 to 30 alone or with one or more hydroxyl functional monomers like hydroxyalkyl acrylates and/or methacrylates and/or polycaprolactone polyol monomers in an effective amount to give the copolymer a hydroxyl number up to about 100.

The aforementioned percent by weight and effective amounts for the monomers of the copolymer flow modifying agent are based on the weight percent of the total monomers for the copolymer including (1) and (2) comonomers and any additional monomers. The weight percent of the one or more particular functional monomers (1) or (2) gives the amount in the aforementioned range for the functional monomers of about 5 to 50 percent by weight based on the weight of polymerizable ethylenically unsaturated monomers. The values given are approximate values in that for values other than zero, somewhat lower values can also be used and for values in the upper region of the ranges, somewhat higher values can be used to give similar results as the values within the ranges. All of the aforementioned effective amounts are based on 100 percent of the solids of the copolymer. The amounts in weight percent of the components (A) and (B) equal 100 percent of the solids of the curable composition without the presence of additional components or additional components as described herein may also be included.

The copolymer flow control agent does not adversely affect intercoat adhesion when the curable coating composition is a thermosetting powder coating with a curable particulate resinous material where the powder coating is used in a multilayered coating as the clear coat. When the coating composition with the film-forming resinous material and the flow control agent is a liquid, a carrier may be used. The carrier can make the coating composition a solvent-borne or water-borne coating composition. Also, other additional components usually found in coating compositions can be present in amounts usually used by those skilled in the art. These amounts of the other additional components and film-forming resinous material provide most of the solids for the curable coating composition.

Another aspect of the invention is a multilayered coating composition of a basecoat/clearcoat composition where the curable coating of the present invention is used in pigmented form as the basecoat or in unpigmented form as the clearcoat either without a carrier as a powder coating or with a carrier as a liquid coating composition.

DETAILED DESCRIPTION OF THE INVENTION

The curable liquid or solid film-forming resinous material of the coating composition of the present invention may be any of the polymers known to those skilled in the art to be useful in curable coating compositions including solvent-borne, water-borne, and powder coatings. The water-borne coatings include those that are water-dilutable, where binders are either molecular dispersed solutions in water or water/solvent blends or binders in the form of dispersions or emulsions. By the term "film forming", it is meant that the resinous material upon curing at ambient or elevated temperature forms a self-supporting continuous film on at least a horizontal surface and even includes polymeric materials that upon removal of any solvents or carriers present in the polymer emulsion, dispersion, suspension or solution, can coalesce to form a film on at least a horizontal surface and is capable of curing into a continuous film.

One suitable class of polymer for the film-forming resinous material includes those which are derived from one or more ethylenically unsaturated monomers. Particularly useful members of this class are the acrylic polymers which are well established for the production of coatings in the automobile industry, such as polymers or copolymers of one or more alkyl esters of acrylic acid or methacrylic acid, optionally together with other ethylenically unsaturated monomers. These polymers are thermosetting and crosslinking. Suitable acrylic or methacrylic esters for this type of polymer include ethyl acrylate, propyl acrylate, n-butyl acrylate, isobutyl acrylate, tert-butyl acrylate, 2-ethylhexyl acrylate, lauryl acrylate, ethyl methacrylate, propyl methacrylate, n-butyl methacrylate, isobutyl methacrylate, tert-butyl methacrylate, lauryl methacrylate, 2-ethylhexyl methacrylate, and so forth. Cyclic esters such as cyclohexyl acrylate and cyclohexyl methacrylate, as well as hydroxyalkyl esters such as 2-hydroxyethyl acrylate or methacrylate, 2-hydroxypropyl acrylate or methacrylate may also be used. In addition, vinyl aliphatic or vinyl aromatic compounds other than alpha-methyl styrene dimer which is considered a chain transfer agent, such as acrylonitrile, methacrylonitrile, styrene, vinyl acetate, vinyl propionate and vinyl toluene can be used. The aforelisted acrylic ester monomers are hereinafter referred to as "Acrylic Ester Monomers". For crosslinking, suitable functional monomers to be used in addition to the aforementioned include acrylic acid, methacrylic acid, hydroxyethyl acrylate, hydroxyethyl methacrylate, 2-hydroxypropyl acrylate, 2-hydroxypropyl methacrylate, N-(alkoxymethyl) acrylamides and N-(alkoxymethyl) methacrylamides, where the alkoxy group may be, for example, a butoxy group, glycidyl acrylate, and/or glycidyl methacrylate.

The film-forming resinous material for use as a basecoat composition in a color-plus-clear, composite, multilayered coating also may contain one or more crosslinking agents. Suitable crosslinking agents include: diisocyanate, diepoxide or, especially, a nitrogen resin, like a condensate of formaldehyde with a nitrogenous compound such as urea, thiourea, melamine or benzoguanamine, or a lower alkyl ether of such a condensate in which the alkyl group contains from 1 to 4 carbon atoms, typically referred to as an aminoplast. Particularly suitable crosslinking agents are melamine-formaldehyde condensates in which a substantial proportion of the methylol groups have been etherified by reaction with butanol or alcohols like ethanol or methanol. Any of these crosslinking agents known to those skilled in the art for use with curable acrylic polymers may be used. For the purposes of the foregoing general definition of the invention, the crosslinking agent, where present, is considered as being a part of the film-forming resinous material.

Other suitable classes of polymers useful as the curable film-forming resinous material are:
 (i) a polyepoxide and a polyacid crosslinking agent;
 (ii) an acrylosilane polymer, an acrylic polyol polymer, and, optionally, an alkylated melamine-formaldehyde crosslinking agent; and
 (iii) a polyisocyanate and a polymer having at least one group that is reactive with isocyanate.

In the curable coating composition of the present invention, the aforedescribed film-forming compositions are capable of film formation with crosslinking. Crosslinking can be through one or more designated polymeric materials with the crosslinking material. For the film-forming resinous materials with the additional polymeric material or with two polymeric materials that are reactive with each other, the additional polymeric material and/or the inter-reactivity of both polymers result in crosslinking. The polyepoxide and a polyacid film-forming material have the polyacid that is used as the crosslinking agent since the polyepoxide is the major component of the film. For the film-forming composition of the acrylosilane polymer and the acrylic polyol polymer, these polymeric materials have functionality so that one reacts to form crosslinks with the other along with any alkylated melamineformaldehyde crosslinking agent. This occurs in a similar manner in the film-forming resinous material of polyisocyanate and a polymer having at least one group that is reactive with isocyanate.

For the aforementioned film-forming resinous materials, any of the polymers and their crosslinkers listed for (i), (ii), and (iii) can be any of those known to those skilled in the art. Non-exclusive examples include U.S. Pat. Nos. 4,650,718 (Simpson, et al.) (column 1, line 61 through column 3, line 40 and column 4, line 55 through column 9, line 15); 4,102,942 (column 3, lines 1–16); 4,798,745 (Martz, et al.) (column 2, line 66 through column 9, line 8); 4,699,814 (Ambrose, et al.) (column 4, line 10 through column 6, line 51); 3,567,692 (Haggis, et al.) (for all that it teaches about polymeric film forming materials); 4,681,811 (Simpson, et al.) (column 1, line 63 through column 10, line 65); and Canadian patent document 1,262,596 (for all that it teaches about polymeric film forming materials), all of the aforelisted patents are hereby incorporated by reference.

The acrylic polymers or copolymers can be used that are of one or more of the Acrylic Ester Monomers prepared via aqueous emulsion polymerization techniques and used directly in the preparation of aqueous coating compositions, or prepared via organic solution polymerization techniques with groups capable of salt formation such as acid or amine groups. Upon neutralization of these groups with a base or an acid, the polymers can be dispersed into an aqueous medium. Generally, any method of producing such polymers that is known to those skilled in the art utilizing art-recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Also, the acrylic polymer can be prepared with N-(alkoxymethyl)acrylamides and N-(alkoxymethyl) methacrylamides.

Besides acrylic polymers, the polymeric film-forming resin for the water-borne coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids are known to those skilled in the art and include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil and the like.

The polyesters and preferably the alkyd resins contain a portion of free hydroxyl and/or carboxyl groups which are available for further crosslinking reactions.

Also, polyurethanes can be used as the film-forming resinous material in the coating composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are more suitable, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The polyester and polyurethane may be prepared with unreacted carboxylic acid groups, which upon neutralization with bases such as amines, allows for dispersion into aqueous medium for use in a water-borne coating composition. Examples of suitable basecoat compositions include the water-borne compositions disclosed in U.S. Pat. No. 4,403,003, (column 2, line 3 through column 13, line 12), which is hereby incorporated by reference.

A suitable liquid film-forming resinous material is an epoxy-acid material when the coating composition is a clearcoat composition of a basecoat/clearcoat composite coating. The multi-package and single-package liquid compositions disclosed in U.S. Pat. Nos. 5,256,452 at columns 1–25 and 4,650,718 at columns 1–16, hereby incorporated by reference, are suitable compositions. In the coating compositions of this patent, the epoxy functional copolymer is a film-forming resinous material which also has the polycarboxylic acid as the crosslinking agent.

For the liquid film-forming resinous materials, the curable coating composition also has water or a solvent as a carrier in art-recognized amounts to function as a carrier. The water and/or other solvents used as carriers in the amounts of the aforelisted and incorporated patents are suitable for the curable coating composition of the present invention. Also, the liquid film-forming resinous materials can have additional components which can be those disclosed in the aforelisted and incorporated patents in the amounts shown therein to comprise the film-forming resinous material.

The preferred film-forming resinous material is a thermosetting powder coating, where the term "powder" means a particulate, finely divided solid polymeric material having a particle size of 0.005 to 100 microns.

The solid particulate resinous material for a powder coating can be, for example:

an epoxy resin and a suitable curing or crosslinking agent for the epoxy resin, for example, a carboxylic functional acrylic resin, dicyandiamide, a polyanhydride or a carboxylic functional polyester resin;

a carboxylic functional acrylic resin and a suitable curing agent for the acrylic resin, for example, triglycidyl isocyanurate or a hydroxyalkylamide; or a carboxylic functional polyester resin and a suitable curing agent for the polyester resin, for example, a blocked isocyanate curing agent or a hydroxylalkylamide.

The particulate film-forming resinous material may also be a thermoplastic particulate mixture of, e.g., polyethylene, polypropylene, polyamide or polyester.

When the powder coating is a transparent or clear topcoat layer used in the "color-plus-clear" composite coating, a particularly preferred powder coating is one with a mixture of a polyepoxide and a polyacid crosslinking agent. The polyepoxides generally have a glass transition temperature (Tg) less than 50° C., more preferably less than 30° C. The Tg of the copolymer contributes to the stability of the powder coating composition. The higher the Tg of the copolymer, the better the stability of the coating. The Tg is described in PRINCIPLES OF POLYMER CHEMISTRY (1953), Cornell University Press. The Tg can actually be measured or it can be calculated as described by Fox in *Bull. Amer. Physics Soc.*, 1, 3 page 123 (1956). The actual measured values for Tg are obtainable by differential scanning calorimetry (DSC) usually at a rate of heating of 18° F. (10° C.) per minute, where the Tg is taken at the first inflection point. Also the Tg can be measured experimentally by using a penetrometer such as a DuPont 940 Thermomedian Analyzer. The Tg of the polymers as used herein for this invention refers to the calculated values unless otherwise indicated.

The curable particulate epoxy film-forming resinous material for use with polyacid materials can be selected from those well known in the art of powder coating compositions. They can be, for example, an epoxy resin such as an epoxy group-containing acrylic polymer or a polyglycidyl ether of a polyhydric alcohol and a suitable curing agent for the epoxy resin such as the polyfunctional carboxylic acid group-containing material or a dicyanamide. Examples of curable particulate resinous materials are described in Reissue U.S. Pat. No. 32,261 and U.S. Pat. No. 4,804,581. Examples of other curable particulate resinous materials are carboxylic acid functional resins such as carboxylic acid functional polyesters and acrylic polymers and suitable curing agents for such materials such as triglycidyl isocyanurate and beta-hydroxyalkylamide curing agents as described, for example, in U.S. Pat. Nos. 4,801,680 and 4,988,767. The curable resinous materials of U.S. Pat. No. 4,988,767 are preferred for the preparation of powder primer surfacers.

The epoxy functional copolymer can be prepared by copolymerizing a glycidyl functional ethylenically unsaturated monomer, typically a glycidyl functional acrylic monomer, such as glycidyl acrylate or glycidyl methacrylate, with an ethylenically unsaturated monomer or mixture of monomers free of glycidyl functionality. In the practice of the invention, the glycidyl functional monomer can be copolymerized with a monomer having a Tg greater than 200° F. (93° C.). A high Tg monomer can assist in preventing caking and instability problems associated with powder coatings. Suitable monomers include methylmethacrylate and styrene.

In addition to the glycidyl functional ethylenically unsaturated monomer and high Tg monomers, a different copolymerizable ethylenically unsaturated monomer or mixture of monomers can also be present. Examples of such monomers include the Acrylic Ester Monomers.

The epoxy-functional copolymer can be prepared by traditional free radical initiated polymerization techniques using suitable catalysts which include organic peroxides and azo-type compounds and chain transfer agents such as alpha-methyl styrene dimer and tertiary dodecyl mercaptan.

The epoxy-functional copolymer usually has: (a) between 25 to 75 percent by weight, based on weight of the copolymer, of the glycidyl functional ethylenically unsaturated monomer; and (b) usually between 25 to 75 percent of a copolymerizable ethylenically unsaturated monomer or mixture of monomers free of glycidyl functionality. The percentages by weight are based on the total weight of (a) and (b) as 100 percent. Preferably, the copolymer has: (a) 35 to 55 percent by weight of the glycidyl functional monomer; (b) 40 to 60 percent by weight of one or more copolymerizable ethylenically unsaturated monomers having a Tg greater than 200° F. (93° C.), such as styrene and methylmethacrylate; and (c) from around 5 to around 20 percent by weight, based on weight, of one or more additional copolymerizable monomers different from (a) and (b) like butylmethacrylate. The percentages by weight are based on the total weight of (a), (b), and (c) as 100 percent.

The Tg of the high Tg monomers mentioned above refers to the calculated value of the homopolymer made from the monomer calculated as described above by Fox. For example, the Tg of methylmethacrylate monomer and styrene monomer is 221° F. (105° C.). The Tg of the copolymer is typically between 77° F. and 158° F. (25° and 70° C.), and more preferably between 95° F. and 131° F. (35° C. and 55° C.).

The epoxy functional copolymer has a number average molecular weight typically between 1000 and 20,000. The preferred number average molecular weight for the epoxy functional copolymer is between 1000 and 2500.

The epoxy functional copolymer usually contains from 3.5 to 5.9 moles of glycidyl functional ethylenically unsaturated monomer per kilogram of epoxy functional copolymer, more preferably between 3.0 and 5.1 moles of glycidyl functional monomer per kilogram of epoxy functional copolymer. The preparation of the epoxy functional copolymer as an epoxy-containing acrylic polymer may be conducted as disclosed in U.S. Pat. No. 4,650,718 (column 1, line 61 through column 3, line 40 and column 4, line 55 through column 9, line 15), incorporated herein by reference. The epoxy-containing acrylic polymer typically has a number average molecular weight between about 1000 and 20,000, preferably about 1000 to 10,000, and more preferably about 1000 to 5000.

The polyacid crosslinking agent in the film-forming resinous material is in amounts of about 10 to 90, preferably 25 to 75 percent by weight based on total weight of resin solids in the film-forming resinous material. The polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid crosslinking agents in which difunctional curing agents are mixed with tri- or higher functionality polyacid crosslinking agents. Polyacid crosslinking agent mixtures including up to about 50 percent of a difunctional curing agent with a trifunctional curing agent are suitable. Higher percentages of difunctional materials can be used if the remainder of the curing agent mixture is higher than trifunctional or if the polyacid crosslinking agent mixture is used with a highly functional polyepoxide component. The acid functionality is preferably carboxylic acid, although acids such as phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. Nos. 4,650,718 (column 1, line 61 through column 3, line 40 and column 4, line 55 through column 9, line 15); 4,681,811 (column 1, line 63 through column 10, line 65); and 4,703,101 (column 3, line 26 to column 6, line 5).

The equivalent ratio of the reactants present in the powder film-forming resinous material (A) is adjusted such that for each equivalent of epoxy there are around 0.3 to around 3.0, preferably 0.75 to 1.5 equivalents of carboxyl (anhydride, if present, is considered monofunctional).

The particulate as well as the liquid film-forming resinous material (A) may also contain additional materials as known to those skilled in the art. For example, an anhydride for improved cure response and copolymer of an alpha olefin and olefinically unsaturated anhydride for improved humidity resistance of the cured coating can be used.

The powder film-forming resinous material (A) is prepared by combining approximately 60 to 90 percent by weight of the epoxy functional copolymer with about 10 to 40 percent by weight, based on total weight of the powder film-forming resinous material (A), of a polycarboxylic acid crosslinking agent. Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclo-hexanedimethanol, pentaerythritol and the like. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides and polyols may also be used.

Typically, the preferred range of epoxy functional copolymer to polycarboxylic acid crosslinking agent is between 70 to 85, more preferably 70 to 80 percent by weight epoxy functional copolymer and between 15 to 30, more preferably 20 to 30 percent by weight polycarboxylic acid crosslinking agent, based on total weight of the powder film-forming resinous material (A). The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent allowing for improved flow and appearance.

The copolymer flow control or flow modifying agents of the present invention may be random copolymers, block copolymers or graft copolymers, which may be used alone or in mixtures thereof. The copolymers are prepared from at least two types of ethylenically unsaturated, polymerizable monomers. One type is (i) acrylic, vinylic, or methacrylic acid esters such as alkyl acrylates or methacrylates containing from 3 to 20 carbon atoms in the alkyl group, where these monomers are devoid of any amine, hydroxyl, and acidic functionality (hereinafter referred to as "Limited Functional Monomer", although preferably this monomer is nonfunctional). Another type (ii) is functional ethylenically unsaturated polymerizable monomer. This (ii) type can be one or more amino fuictional acrylates or methacrylates, or one or more acid functional acrylates and/or methacrylates. Either the amino functional acrylates and/or methacrylates or the acid functional acrylates and/or methacrylates can be the only type of functional monomer used in preparing the copolymer. Additionally, both of these type (ii) monomers can be used along with one or more hydroxyl functional monomer like hydroxyalkyl acrylates and/or methacrylates and/or polycaprolactone polyol monomers where the hydroxyalkyl acrylates and/or methacrylates preferably have from 2 to 8 carbon atoms in the hydroxyalkyl group. 10 Further non-exclusive examples of the Limited Functional Monomer (i) are the alkyl acrylates or methacrylates represented by the following general formula:

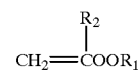

wherein $R_2$ is a hydrogen atom or an alkyl group having 1 to 3 carbon atoms, and $R_1$ is an alkyl group or substituted alkyl group having 3 to 20 carbon atoms. Examples of suitable Limited Functional Monomers (i) are hexyl acrylate and methacrylate, 2-ethylhexyl acrylate, isodecylmethacrylate and lauryl methacrylate, where 2-ethylhexyl acrylate is preferred as a single component. Suitable mixtures are isodecylmethacrylate, and/or 2-ethylhexyl acrylate, with alkylacrylate, wherein the alkyl group has 2 to 4 carbon atoms. The alkyl acrylates or methacrylates (i) preferably are used in amounts of 50 to 70 percent by weight, based on total weight of polymerizable ethylenically unsaturated monomers for the flow modifying copolymer.

The type (ii) comonomer as amino functional ethylenically unsaturated polymerizable monomer can be any of those known in the art, particularly one or more or mixtures of tertiary amines, such as: amino alkyl ($C_2$–$C_4$) esters of acrylic and methacrylic acids such as: N,N-dimethylaminoethyl methacrylate (DMAEMA); dimethylaminopropyl methacrylamide (DMAPMA); N,N-diethylaminoethyl acrylate (DEAEA); diethylaminoethyl methacrylate (DEAEMA); N-tert-butylarninopropyl acrylate (tBAPA); N-tert-butylaminoethyl methacrylate (tBAEMA); oxazolidinylethyl methacrylate (nOXEMA); N,N-dimethylaminophenyl methacrylate (DMAPMA).

The amine value of the copolymer can depend on whether the amine functional comonomer is used alone as the functional monomer or with other functionality such as acid and/or hydroxyl. The amount of the amine functional comonomer is effective generally to give an amine value for the copolymer in the range of about 2 to about 70, preferably 6 to 55 and most preferably 6 to 35. When the amine value for the copolymer is in the lower portion of the range especially around 2, the better performing copolymer also will have the additional functionality such as the acid and/or hydroxyl functionality. The amine value for the copolymer is preferably in the range of 2 to 15 when these other functionalities are present. Of course, the copolymer with a higher amine value can also have the hydroxyl and/or acid functionality present. The copolymer with an amine value of greater than 25, for instance a value of 26, up to 55 without the hydroxyl and/or acid functionality can also be suitable for use as a flow control material that results in good appearance of the final coating. The amine value is determined from the milliequivalents of amine, which is determined from the American Society of Testing Materials (ASTM) standard methods D-2073 for Milliequivalents (Meq.) of amine. The Meq. of amine can be converted into an amine value by multiplying the Meq. of amine by 56.1 to get the milligrams of KOH per gram of material. For a monomer like DMAEMA, this is achieved with an amount in the range of about 1 to about 10 and preferably 2 to 5 weight percent of the total monomers to prepare the copolymer. For monomers with higher amine equivalent weights, more of the monomer is used to give the copolymer the desired amine value.

The following list of monomers are representative of the applicable acidic functional type (ii) monomers which contain at least one available carboxylic acid group and include one or more and mixtures of: acrylic acid, methacrylic acid, crotonic acid, itaconic acid, maleic acid and the $C_1$–$C_4$ alkyl half esters of maleic and fumaric acids, for example, as methyl hydrogen maleate and butyl hydrogen fumarate as well as any other acidic monomers which are capable of being copolymerized with the particular flow modifying copolymer.

When the acid functional comonomer is present alone as the functional monomer, the amount of this monomer used on a weight percent basis of the total monomers to comprise the copolymer is effective to give an acid number for the copolymer in the range from about 10 to 30 and preferably 15 to 25. Acid number is determined in accordance with the American Society of Testing Materials (ASTM) standard method D-1639 for acid number. When an acid-containing monomer like acrylic or methacrylic acid is employed, the acid number for the copolymer is achieved with an amount of the monomer in the range of about 1 to about 10 and preferably 2 to 6 weight percent of the total monomers to prepare the copolymer. For monomers with higher acid equivalent weights, more of the monomer is used to give the copolymer the desired acid value.

Whether used with the amine functional comonomer or the acid functional comonomer, examples of the one or more or mixtures of hydroxyalkyl acrylates and/or methacrylates as type (ii) monomers are the acrylic and methacrylic acid esters of aliphatic alcohols having from 1–18 carbon atoms such as methyl, ethyl, propyl, butyl, octyl and lauryl alcohols. Examples of the hydroxyalkyl esters of acrylic and methacrylic acids include: hydroxyethyl acrylate and/or hydroxyethyl methacrylate; hydroxypropyl acrylate and/or hydroxypropyl methacrylate; hydroxybutyl acrylate and hydroxybutylmethacrylate; hydroxystearyl acrylate and hydroxystearyl methacrylate.

Examples of the polycaprolactone polyol monomers suitable for the type (ii) monomer are homopolyester polyol ring-opened polymers of cyclic esters such as the TONE polyol series: 0200, 0221, 2201, and 2221, commercially available from Union Carbide, New York, N.Y. TONE Polyol 0200 has a molecular weight of (M. W.) about 530–543, and 0221, 2201, and 2221 are difunctional. The 0200 series of TONE polycaprolactone diols have a molecular weight of 530–3000. These diols have a melting point of 30° C.–60° C. and a density of 1.08 g/cm<3>at 100° F., and are a white solid. Typical properties of the TONE 0200 polyols are shown in the following Table:

| TONE Polyol | Average Molecular Weight | Hydroxyl Number, mg. KOH/g | Melting Point Range, ° C. | Specific Gravity 44/20° C. | Viscosity Centistokes 85° C. |
|---|---|---|---|---|---|
| 0200 | 530 | 212 | 30–40 | 1.073 | 88 |
| 0210 | 830 | 135 | 35–45 | 1.072 | 167 |
| 0230 | 1250 | 90 | 40–50 | 1.071 | 284 |
| 0240 | 2000 | 56.1 | 45–55 | 1.071 | 635 |
| 0250 | 3000 | 37.4 | 50–60 | 1.070 | 1490 |

The hydroxyalkyl acrylates and/or methacrylates and/or polylactone polyol monomer can be used in effective amounts to give the copolymer at 100 percent solids a hydroxyl number in the range of around up to 100 and preferably 40 to 100. The hydroxyl number can be determined in a manner similar to the ASTM E-222 method. One approach to accomplishing this hydroxyl number is with an amount of the hydroxyalkyl acrylate and/or methacrylate with a hydroxyl equivalent weight of around 116 that is present in the range of 0 to 25, preferably 1 to 25 weight percent based on total weight of polymerizable ethylenically unsaturated monomers for the copolymer. With monomers having higher hydroxyl equivalent weights, more of the monomer on a weight percent basis is used. For instance, typically an amount of the hydroxyl functional monomer in the range of from 10 to 50 percent by weight of the total monomers can be used. Also, mixtures of the different types of the hydroxyl functional monomers in type (ii) can be used.

The total weight percent of the monomers reacted together to comprise the copolymer is 100 weight percent. The amounts of the monomers for preparation of the copolymer, which can include copolymers of more than two types of monomers, depend to some degree on the types of comonomers that are used. With the presence of the hydroxyl functional monomer, the amount for the amine functional monomer or acid functional monomer can be the same as that when these monomers are used by themselves as the functional monomer. The amount of the non-amine, non-hydroxyl, and non-acidic monomer ranges preferably from about 75 to about 99 and most preferably about 85 to 99, when either the amine functional monomer or the acid functional monomer is present as the only other monomer for the copolymer. With the copolymer flow control agent having present both the amine and hydroxyl functionality or acid and hydroxyl functionality, improved recoat adhesion of the powder clearcoat in a composite coating is possible.

Rather than or in addition to using the aforementioned type (ii) functional monomers for preparing the copolymer, the copolymer can have the addition polymerization product of one or more ethylenically unsaturated comonomers with precursor functionality along with the Limited Functional Monomer. The precursor functionality is a moiety or group that is reactive with another chemical compound or group to form the functional moiety on the copolymer. For example, epoxy functionality can be a precursor functionality for acid functionality on the copolymer through reaction of the precursor functionality on the copolymer with phosphoric acid as a phosphoric acid reactable functional acrylate and/or methacrylate monomer. Also, the epoxy functionality can be precursor functionality for subsequent or post-reaction with primary and/or secondary amines. It is believed without limiting the invention that this latter post-reaction involves ring opening of the epoxy group to form an amino group and a hydroxyl group. When a primary amine is post-reacted with the epoxy functional copolymer, secondary amine groups are formed, and when a secondary amine is post-reacted, tertiary amine groups are formed on the copolymer. Nonexclusive examples of suitable amines include: ammonia, methylamine, ethylamine, diethylamine, dibutylamine and the like known to those skilled in the art.

Such phosphated epoxy functional polymers useful herein can be prepared by reacting phosphoric acid or an equivalent thereof with the epoxy functionality of an epoxide acrylic and/or methacrylic copolymer having more than 1.0 glycidyl group per polymeric molecule. The epoxy functional copolymer is formed from reaction of the epoxide acrylic and/or methacrylic and/or allylglycidyl ether monomer like glycidyl methacrylate with one or more of the aforementioned Limited Functional Monomers (i). For this copolymer with precursor functionality, generally the monomer of the Limited Functional Monomers are those which also do not contain a group reactive with the epoxy group. Even monomeric compounds such as the monovinyl aromatic monomers of the benzene class, e.g., styrene, and vinyl toluene can be used. These copolymers can have pendant epoxy groups from the polymerization of (α) glycidyl acrylate and/or methacrylate, or allylglycidyl ether, and at least one of the (i) polymerizable Limited Functional Monomers. Epoxy functional acrylic and/or methacrylic copolymers useful herein can be prepared by methods as are generally known in the art, examples of which can be found in "Handbook of Epoxy Resins", Lee and Neville, 1967, McGraw-Hill Book Company or as in U.S. Pat. No. 4,681,811 at column 1 1, line 5 through column 12, line 63, Examples A through Example C, hereby incorporated by reference.

In the preparation of the copolymers used in the present invention, the monomer with the epoxy functionality (α) should be used in a suitable amount of percent by weight of total monomers to be effective in resulting upon phosphatizing in an acid functional copolymer with an amount of acid functionality within the aforedescribed range of acid numbers. Typically, this amount of (α) monomer can be in the range of 1 to 60 percent by weight, preferably 5 to 30 percent by weight, on the basis of the total monomers.

Generally, the reaction conditions to form the epoxy-containing copolymer are similar to those described below for producing the aforedescribed acid or amine functional copolymer with or without hydroxyl functional monomer. In the copolymerization of the monomer (i) with the monomer (ii) or with the epoxy functional copolymer, monomer (α) rather than monomer (ii), into the copolymer, any free radical polymerization initiator known to those skilled in the art can be employed according to methods known in the art. These methods include solution polymerization, bulk polymerization, and the like. In the present invention, the copolymers preferably are formed in solution in an organic solvent and thus the copolymers obtained according to polymerization methods other than the solution polymerization method can be used after being dissolved in a specific organic solvent.

The phosphoric acid that is used to react with the epoxy functional copolymer can be a 100 percent orthophosphoric acid, superphosphoric acid, or the aqueous solutions thereof such as 85 percent phosphoric acid aqueous solution. Other forms of the phosphoric acid and triphosphoric acid can be used including those such as, metaphosphoric acid, pyrophosphoric acid, polyphosphoric acid, and the like known to those skilled in the art. Also, the polymeric or partial anhydrides of the phosphoric acids can be used. Aqueous phosphoric acids typically used are about 70 to 90 percent and preferably about 85 percent phosphoric acid. Also, the phosphoric acid may be used in a solution of one or more alcohols like those discussed below. The ratio of reactants of phosphoric acid reacted with the epoxy functionality of the copolymer can be in a ratio of equivalents of each of around 1 to 1. Use of less of an amount of phosphoric acid to epoxy equivalent could result in gelation, while use of more that a 1 to 1 ratio of phosphoric acid to epoxy equivalent could result in the presence of excess phosphoric acid, which should be avoided.

The reaction conditions of elevated temperature and time are sufficient so that the phosphoric acid takes part in ring opening reactions of epoxy groups of the epoxy functional polymer. It is believed without limiting the invention that the phosphoric acid reacts by an epoxy group reacting with a hydroxyl group on the phosphoric acid, leaving at least one hydroxyl group on the phosphoric acid. Preferably, the resulting phosphated acrylic and/or methacrylic copolymer is substantially free of an epoxy group.

In addition to the polymerizable ethylenically unsaturated monomers (i) and (ii), or (i) and (α) and optionally the hydroxyl functional ethylenically unsaturated monomer of (ii), the copolymer can contain moieties obtained from other polymerizable ethylenically unsaturated monomers. Examples of such monomers would be vinyl aromatic monomers such as styrene and alpha-methylstyrene; nitrites such as acrylonitrile; vinyl and vinylidene halides such as vinyl chloride and vinylidene fluoride; vinyl esters such as vinyl acetate and vinyl propionate and alkyl acrylates or methacrylates containing from 1 to 4 carbon atoms in the alkyl group such as methylmethacrylate, butyl acrylate and butylmethacrylate, which is preferred. when these optional polymerizable ethylenically unsaturated monomers are employed, they are used in amounts of up to 30, preferably 5 to 30 percent by weight based on total weight of polymerizable ethylenically unsaturated monomers. Preferably, these monomers are one or more alkyl acrylates and/or methacrylates having a calculated Tg of less than 0° C. and most preferably less than (–20)° C.

Generally, the weight average molecular weight of the copolymer can range from about 1000 to 40,000, preferably 1000 to 15,000. The weight average molecular weights do not limit the performance of the invention, but weight average molecular weights greater than 15,000 may have decreased flow properties due to higher viscosities. The weight average molecular weight of the copolymers can be determined by gel permeation chromatography (GPC) using a polystyrene standard. By such method, it is not the actual molecular weight which is measured but an indication of the molecular weight as compared to polystyrene. The values which were obtained are commonly referred to as polystyrene numbers; however, for the purposes of this application, they are referred to as molecular weights.

Generally, the glass transition temperature (Tg) of the copolymer is less than 10° C. and preferably less than 0° C. and most preferably in the range of –60° C. to –10° C. The Tg can be calculated and measured in the aforedescribed manner. The Tg of the copolymer is not limiting of its performance as a flow additive but Tg's greater than 10° C. are not preferred because of decreased flow on coating application.

The flow modifying copolymer can be prepared by heating the polymerizable ethylenically unsaturated monomers together preferably in the presence of an organic solvent and in the presence of a free radical initiator, e.g., an organic peroxide such as tertiary-amyl peroxy acetate, tertiary-butyl perbenzoate and the like, or an azo compound such as azobisisobutyronitrile and the like, at a temperature generally up to the reflux of the copolymerizable material. Generally, temperatures can range from 30° C. to about 220° C., preferably from 80° C. to 180° C., for a time sufficient to complete the polymerization, generally a period of time varying between 1 to 24 hours, preferably 1 to 3 hours. Also, it is preferred to conduct the reactions under a nitrogen gas blanket. Additionally, it is preferred to have a second initiator addition sometimes referred to as a chaser initiator where "chaser" indicates that they are added after the original initiation of the reaction.

Solvents or mixtures of solvents that are useful in preparing the flow modifying copolymer including the epoxy fuictionally copolymer and the phosphating reaction assist in achieving better reaction control. A non-reactive solvent can be used, examples of which include the ketones, ethers, alcohols, and ether alcohols. Specific examples of suitable solvents are methyl ethyl ketone, methyl butyl ketone, ethanol, propanol, isopropanol, butanol, butoxyethanol, and diethylene glycol monobutyl ethers like butyl Cellosolve solvent, and at least one or more alcohols having 1 to 6 carbon atoms or ethyleneglycol monoalkyl ethers.

The alcoholic solvent can be used alone, but usually is used in a mixture of said alcohols or ethyleneglycol monoalkyl ethers with other organic solvents, when solubility, and affinity of the copolymers are taken into account. The other organic solvent is one or a combination of two or more organic solvents, such as aromatic hydrocarbons such as toluene or xylene; ketones such as methyl ethyl ketone or methyl isobutyl ketone; aliphatic or alicyclic hydrocarbons such as normal hexane, cyclohexane, methylcyclohexane or ethylcyclohexane; esters such as ethyl acetate or butyl acetate. Suitable amounts can be of at least five percent by weight of the alcoholic solvent is present in the total solvents, as described above. In addition to providing all of the acid functionality of the copolymer as a comonomer or coreactant with the Limited Functional Monomer with or without the hydroxyl functional comonomer, additional acidic functionality can be provided to the acid and hydroxyl functional copolymer by a post-reaction mechanism. The copolymer can be reacted with from 1 to 20, preferably 1 to 10, percent by weight of an anhydride of a cyclic hydrocarbon. The percentage by weight is based on weight of copolymer and cyclic hydrocarbon. Such modification introduces carboxylic acid functionality into the copolymer which can further increase the adhesion properties of the resulting coating. Examples of anhydrides of cyclic hydrocarbons are tetrahydrophthalic anhydride, hexahydrophthalic anhydride, alkyl-substituted hexahydrophthalic anhydrides such as methylhexahydrophthalic anhydride. Hexahydrophthalic anhydride is preferred. Use of greater than 10 percent by weight of anhydride is not preferred because of poor flow properties. The anhydride modified copolymers will typically have acid values of 5 to 25 measured on a resin solids basis and determined according to ASTM E-222.

The thermosetting or curable coating compositions of this invention generally contains from 40 to 99.9 percent by weight of the film-forming resinous material, where lower amounts in the range are generally used with the curable liquid coating composition. In this case the coating composition also has a number of additional components. When the curable coating composition is the preferred powder coating, the film-forming resinous material is the particulate thermosetting resinous material, which is present in an amount in the range from about 95 to about 99.9 percent by weight. In either case an amount from about 0.01 to about 10 percent by weight of the flow modifier, i.e., the copolymer is used where the percentages by weight are based on total resin solids for the curable composition. With the preferred powder coating, the weight percent is of the total resins of the particulate resinous material and flow modifier. Preferably, the copolymer will be included in the powder coating composition in amounts of 0.1 to 3 percent by weight, more preferably from about 0.5 to about 2 percent by weight for clear coat applications.

The thermosetting powder coating compositions of the invention can optionally include other materials such as pigments, fillers, light stabilizers and antioxidants. Further, the compositions can include anti-popping agents. A pigment can be included in the coating composition in amounts of 1 to 50 percent by weight based on total weight of the composition in order to give a suitable color to the resultant coating. Suitable pigments include, for example, titanium dioxide, ultramarine blue, phthalocyanine blue, phthalocyanine green, carbon black, graphite fibrils, black iron oxide, chromium green oxide, ferride yellow and quindo red.

Anti-popping agents can be added to the composition to allow any volatile material to escape from the film during baking. Benzoin is a commonly preferred anti-popping agent and when used is generally present in amounts of from 0.5 to 3.0 percent by weight based on total weight of the powder coating composition.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The flow additive of the present invention can be adsorbed onto a precipitated silica surface to provide for a more free flowing silica powder which is typically 60 to 70 percent by weight active in terms of flow additive content.

The thermosetting powder coating compositions are prepared by melt blending the ingredients. This can be accomplished by first blending the ingredients in a high shear mixer such as a planetary mixture, and then melt blending in an extruder from about 80° C. to about 130° C. The extrudate is then cooled and pulverized into a particulate blend. Such a particulate mixture can be applied preferably by spraying techniques. The thermosetting powder coating compositions of the invention can be used as primers or as primer surfacers or as chipguard primers in which they are applied over previously applied electrodeposited primers and then subsequently topcoated with a standard finishing composition. Preferably, they are used as clearcoats in color-plus-clear or basecoat, clearcoat composite coatings.

Also, the flow modifying copolymer of the present invention can be used with liquid film-forming resinous materials, as noted above, in any manner known to those skilled in the art that used the flow additives like Modaflow (or Resiflow) flow additives, available from Monsanto Chemical Company of St. Louis, Mo.

The coating composition with the flow additive copolymer and preferably the particulate thermosetting powder coating composition can be applied directly to a substrate of, for example, metal such as steel or aluminum. Most preferably, the powder coating is a clearcoat for application over or with any basecoat formulations known to those skilled in the art such as water-borne basecoats. Examples of which include those similar to the aforedescribed water-borne film-forming resinous materials that include one or more pigments and those available from PPG Industries Inc. Application can be by spraying, and in the case of a metal substrate, by electrostatic spraying which is preferred, or by the use of a fluidized bed. Also, the coating composition can be applied as a primer, primer surfacer or chipguard primer. The coating powder can be applied in a single sweep or in several passes to provide a film having a thickness after cure of from 1 to 15, usually 2.0 to 4.0 mils.

After application of the coating composition such as the preferred powder coating, the powder coating substrate is baked at a temperature sufficient to cure the product, typically at about 250° F. to about 400° F. (121° C. to 204° C.) for about 1 to 60 minutes, and preferably at about 300° F. to 350° F. (149° C. to 177° C.) for about 10 to 3 minutes.

While the powder coating composition can be applied directly upon bare metal, that is, upon untreated, unprimed steel or upon pretreated, i.e., phosphatized unprimed steel, in one embodiment of the invention the powder coating composition is applied to a metal substrate having a thin layer of electrodeposited primer coating. The electrodeposited primer layer can be cured or uncured before application of the powder coating composition. The electrodeposited primer coating upon the metal substrate can be, for example, a cathodic electrodeposition primer composition such as those available from PPG Industries, Inc. under the UNI-PRIME trademark. In one aspect of the present invention, it is contemplated that the powder coating composition can be applied directly upon at least a portion of an uncured electrodeposited primer coating, for example, the electrodeposited primer coating deposited over an automotive or truck body and thereafter both the electrodeposited primer coating and primer coating can be co-cured by heating at a temperature between 300° F. to 350° F. (149° C. to 177° C.) for about 10 to 30 minutes. When using the powder coating composition of the present invention as a chipguard primer, the coating can be applied to a portion of the electrodeposited coating, for example, that portion susceptible to stone chipping leaving the rest of the area of the electrodeposited primer uncoated with the chipguard primer.

EXAMPLES

The following examples show the preparation of various ingredients utilized in the thermosetting powder coating compositions of the present invention. All of the amounts are in parts by weight as grams of the actual component used in preparing the copolymer flow additive or powder coating formulation.

Resin synthesis Examples 1–11 show the preparation of the flow control copolymer of the present invention. Examples 1–5 show the copolymer formed from the amine functional monomer with (Examples 1–3) and without (Examples 4–5) the hydroxyl functional monomer. Examples 6–9 show the copolymer formed from the acid functional monomer with (Examples 6–7) and without (Examples 8–9) the hydroxyl functional monomer as a comonomer along with the non-functional acrylate monomer. Examples 10 and 11 show the copolymer formed from the reaction of phosphoric acid with (Example 11) and without (Example 10) the hydroxyl functional monomer. Also comparative Examples I and II show a copolymer prepared without any functional monomer, Example I, and with only hydroxyl functional acrylate monomer in Example II.

Procedure for Copolymer Synthesis in Examples 1–7

An initial solvent portion was charged into a four-neck flask, which serves as the reaction vessel, and which was equipped with a thermocouple, a reflux condenser and a stirrer. The initial solvent charge is heated to reflux under a nitrogen gas blanket. A "first initiator mixture" is prepared in a separate premix flask. Also, the monomer mixture is prepared in a separate second premix flask. The first initiator mixture is added dropwise from a first addition funnel into the reaction vessel over a period of time 3.5 hours (T1) while maintaining the reaction at reflux and under a nitrogen gas blanket. Fifteen minutes (T2) after the start of the initiator addition, the monomer mixture is added dropwise from a second addition funnel to the reaction vessel over three hours (T3). After the completion of the addition of the first initiator mixture, the reaction mixture is held at reflux for 30 minutes (T4). After this period of time, a "second initiator mixture", which is premixed, is added dropwise by the addition funnel to the reaction vessel over 30 minutes (T5). (After the completion of each addition, a portion of the solvent is added as a rinse.) The reaction is then held at reflux under the nitrogen blanket for two hours (T6) after which the reaction mixture is cooled to 120° C. (Temp. 1). The reaction mixture is vacuum stripped to remove volatile components. The reaction mixture is analyzed for solids content, number average molecular weight as determined by gel permeation chromatography using a polystyrene standard, and one or more, depending on the particular monomers used, of the following: a measured amine equivalent weight, in milliequivalents/gram; a hydroxyl number; and an acid number. The aforementioned measured characteristics of the copolymer were obtained by procedures based on the following American Society of Testing Materials (ASTM) standard methods: D-2369 for % solids, D-2073 for milliequivalents of amine, D-1957 for hydroxyl value (also referred to as hydroxyl number), D-1639 for acid number. The milliequivalents (Meq.) of amine can be converted into amine value by multiplying the Meq. of amine by 56.1 to get the milligrams of KOH per gram of material.

In the preparation of Example 1, xylene was the solvent which was charged into the reaction vessel in the parts by weight shown in Table 1. The tert-amyl peracetate (60% solution) and xylene were mixed together as a "first initiator mixture" in the parts shown in Table 1. N,N-dimethylaminoethyl methacrylate, hydroxyethyl acrylate and 2-ethylhexyl acrylate were also mixed together as a monomer mixture in the amounts shown in Table 1. The "second initiator mixture" was premixed from tert-butyl peracetate (50 % solution) and xylene in the amounts shown in Table 1. Examples 2–5, which are listed below in Table 1, were synthesized in a similar manner with the components shown in Table 1.

TABLE 1

| | Examples 1–5 | | | | |
| --- | --- | --- | --- | --- | --- |
| | Parts by Weight | | | | |
| Components | Example 1 | Example 2 | Example 3 | Example 4 | Example 5 |
| Initial solvent charge | | | | | |
| Xylene | 312.5 | 312.5 | 1131.3 | 257.5 | 432.0 |
| Monomer mixture | | | | | |

TABLE 1-continued

Examples 1–5

| Components | Example 1 | Example 2 | Example 3 | Example 4 | Example 5 |
|---|---|---|---|---|---|
| N,N-Dimethylaminoethyl methacrylate | 20.0 | 40.0 | 140.0 | 60.0 | 168.0 |
| Hydroxyethyl acrylate | 84.0 | 84.0 | 1176.0 | — | — |
| 2-Ethylhexyl acrylate | 1896.0 | 1876.0 | 5684.0 | 1470.0 | 2232.0 |
| Ethyl acrylate | — | — | — | 470.0 | — |
| First initiator mixture | | | | | |
| tert-Amyl peracetate (60% solution)[1] | 25.0 | 25.0 | 87.5 | — | — |
| Di-tert-amyl peroxide | — | — | — | 15.0 | 36.0 |
| Xylene | 125.0 | 125.0 | 437.5 | 180.0 | 108.0 |
| Second initiator mixture | | | | | |
| tert-Butyl peracetate (50% solution)[2] | 20.0 | 20.0 | 70.0 | 20.0 | 24.0 |
| Xylene | 30.0 | 30.0 | 105.0 | 30.0 | 24.0 |
| Resin properties | | | | | |
| % Solids (110° C./1 hour) | 99 | 97 | 99 | 99 | 97 |
| Meq Amine | 0.143 | 0.093 | 0.090 | 0.153 | 0.324 |
| Hydroxyl Number | 21.4 | 21.7 | 79.6 | — | — |
| Weight average molecular weight | 4520 | 5955 | 8423 | 23824 | 4340 |

[1]Available as a 60% solution in odorless mineral spirits as Lupersol 555 M60 from Elf Atochem North America, Inc.
[2]Available as a 50% solution in odorless mineral spirits from Elf Atochem North America, Inc.

PREPARATION OF EXAMPLES 6 and 7

Example 6

In Examples 6 and 7, an isobutyl alcohol and Dowanol PM (propylene glycol monomethylether) mixture in the amounts shown in Table 2 constituted the solvent that was charged into the reaction vessel. The "first initiator mixture" was Vazo 67, 2,2'-azobis(2-methylbutyronitrile) mixed with Dowanol PM. The monomer blend and the second initiator mixture were prepared and added from the amounts of the components shown in Table 2.

TABLE 2

Examples 6 and 7

| Components | Example 6 | Example 7 |
|---|---|---|
| Initial solvent charge | | |
| Isobutyl alcohol | 72.4 | 72.4 |
| Dowanol PM[1] | 195.1 | 195.1 |
| Monomer mixture | | |
| Methacrylic acid | 64.0 | 50.0 |
| Hydroxyethyl acrylate | 170.0 | 420.0 |
| 2-Ethylhexyl acrylate | 1666.0 | 1530.0 |
| Styrene | 100.0 | — |
| First initiator mixture | | |
| Vazo 67[2] | 60.0 | 60.0 |
| Dowanol PM | 180.0 | 180.0 |
| Second initiator mixture | | |
| tert-Butyl peracetate (50% solution)[3] | 20.0 | 20.0 |
| Dowanol PM | 20.0 | 20.0 |
| Resin properties | | |
| % Solids (110° C./1 hour) | 98 | 99 |
| Acid Value | 19.5 | 16.2 |
| Hydroxyl Number | 45.2 | 100.8 |
| Weight average molecular weight | 13418 | 10702 |

[1]Propylene glycol methyl ether, available from Dow Chemical Company.
[2]2,2'-Azobis(2-methylbutyronitrile), available from E. I. duPont.
[3]Available as a 50% solution in odorless mineral spirits from Elf Atochem North America, Inc.

The preparation of Examples 8 and 9 and Comparative Examples I and II (Comp. Examples) involved the components and their amounts as shown in Table 3, and involved the same process which differed from the process of the preparation of Examples 1–7. The differences were in the T1, T3, and T4 time periods and the temperatures at the T4 and T6 time periods. T1 was 2.5 hours, T3 was 2 hours and T4 was 1 hour at 130° C. rather than at reflux as was the temperature for the T6 holding period.

TABLE 3

Examples 8 and 9 and Comparative Examples I and II

| Components | Example 8 | Example 9 | Comp. Example I | Comp. Example II |
|---|---|---|---|---|
| Initial solvent charge | | | | |
| Xylene | 257.5 | 757.5 | 106.3 | 179.5 |
| Monomer mixture | | | | |

TABLE 3-continued

Examples 8 and 9 and Comparative Examples I and II

| | Parts by Weight | | | |
|---|---|---|---|---|
| Components | Example 8 | Example 9 | Comp. Example I | Comp. Example II |
| Methacrylic acid | 100.0 | — | — | — |
| Acrylic acid | — | 150.0 | — | — |
| 2-Ethylhexyl acrylate | 1440.0 | 4410.0 | 750.0 | 1102.5 |
| Ethyl acrylate | 460.0 | 1440.0 | 250.0 | 330.0 |
| Hydroxyethyl acrylate | — | — | — | 67.5 |
| First initiator mixture | | | | |
| Di-tert-amyl peroxide | 15.0 | 45.0 | 7.5 | 11.3 |
| Xylene | 180.0 | 540.0 | 105.0 | 135.0 |
| Second initiator mixture | | | | |
| tert-Butyl peracetate (50% solution) | 20.0 | 60.0 | 10.0 | 15.0 |
| Xylene | 30.0 | 90.0 | 15.0 | 22.5 |
| Resin properties | | | | |
| % Solids (110° C./1 hour) | 99 | 99 | 99 | 100 |
| Acid Value | 29.1 | 18.6 | — | — |
| Hydroxyl Number | — | — | — | 21.0 |
| Weight average molecular weight | 16254 | 15294 | 12895 | 25058 |

PREPARATION OF EXAMPLES 10 AND 11

Example 10

Step 1. Xylene (312.5 parts) was charged into a four-neck flask which was equipped with a thermocouple, a reflux condenser and a stirrer, which serves as the reaction vessel and heated to reflux under a nitrogen gas blanket. The tert-amyl peracetate (25.0 parts of 60% solution) and 125.0 parts of xylene were mixed together (first initiator mixture). A total of 200.0 parts of glycidyl methacrylate and 1800.0 parts of 2-ethylhexyl acrylate were also mixed together. The first initiator mixture was added dropwise to the reaction vessel over a period of about 2.5 hours while maintaining the reaction at reflux. Fifteen minutes after the start of the first initiator mixture addition, the monomer mixture was added dropwise to the reaction vessel over a period of two hours. At the completion of the first initiator addition, the reaction mixture was held at reflux for one hour. The reaction mixture was cooled to 130° C.[1] Then a second initiator mixture consisting of tert-butyl peracetate (20.0 parts of 50% solution) mixed with 30.0 parts of xylene was added dropwise to the reaction mixture over 30 minutes at 130° C. (After the completion of each addition, 5.0 parts of xylene was added as a rinse.) The reaction was then held for two hours at reflux. The reaction mixture had the solids content, an epoxy equivalent weight of 1898 and weight average molecular weight as determined by gel permeation chromatography using a polystyrene standard all as shown below in the Table 4.

[1] In Example 11, the reaction mixture temperature was maintained at reflux during the addition of the second initiator mixture.
[2] In Example 11, the reaction mixture temperature was maintained at reflux for the two hour hold period after the second initiator mixture addition.

Step 2. A total of 1282.8 parts of the product from Step 1 together with 224.4 parts of butyl cellosolve, was charged into a four-neck flask which was equipped with a thermocouple, a reflux condenser and a stirrer, and heated to 55° C. under a nitrogen gas blanket. A total of 80.6 parts of 85 % phosphoric acid was added to the reaction mixture over 30 minutes. After 5 hours and 20 minutes, the reaction mixture was heated to 120° C. and vacuum stripped to remove the volatile components. The reaction mixture had the solids content, acid value, and hydroxyl number all as shown below in Table 5.

Example 11, which is listed below in Tables 4 and 5, was synthesized in a similar manner.

TABLE 4

Step 1. Examples 10 and 11

| | Parts by Weight | |
|---|---|---|
| Components | Example 10 | Example 11 |
| Initial solvent charge | | |
| Xylene | 312.5 | 312.5 |
| Monomer mixture | | |
| Glycidyl methacrylate | 200.0 | 200.0 |
| Hydroxyethyl acrylate | — | 80.0 |
| 2-Ethylhexyl acrylate | 1800.0 | 1720.0 |
| First initiator mixture | | |
| tert-Amyl peracetate (60% solution) | 25.0 | 25.0 |
| Xylene | 125.0 | 125.0 |
| Second initiator mixture | | |
| tert-Butyl peracetate (50% solution) | 20.0 | 20.0 |
| Xylene | 30.0 | 30.0 |
| Temperature during second initiator addition | 130° C. | reflux |
| Post-second initiator hold temperature | 130° C. | reflux |
| Resin properties | | |
| % Solids (110° C./1 hour) | 82 | 81 |
| Epoxy Equivalent Weight | 1897.9 | 1832.3 |
| Hydroxyl Number | — | 50.1 |
| Weight average molecular weight | 5897 | 7084 |

TABLE 5

Step 2. Examples 10 and 11

| | Parts by Weight | |
|---|---|---|
| Components | Example 10 | Example 11 |
| Initial charge | | |
| Resin from Step 1 | 894.0 | 1282.8 |
| Butyl Cellosolve | 265.0 | 224.4 |
| Addition charge | | |
| Phosphoric acid (85%) | 57.6 | 80.6 |
| Resin properties | | |
| % Solids (110° C./1 hour) | 99 | 99 |
| Acid Value | 41.1 | 32.9 |
| Hydroxyl Number | — | 40.9 |

TABLE 6

Examples 12 and 13
Two copolymers with amine functionality were prepared in a manner similar to that of Example 1 from the components listed in Parts by Weight in Table 6.

| Components | Example 12 | Example 13 |
|---|---|---|
| Initial solvent charge | | |
| Toluene | 631.0 | 80.0 |

TABLE 6-continued

Examples 12 and 13
Two copolymers with amine functionality were prepared in a manner similar to that of Example 1 from the components listed in Parts by Weight in Table 6.

| Components | Example 12 | Example 13 |
|---|---|---|
| Xylene | 525.2 | 50.0 |
| Monomer mixture: | | |
| N,N-Dimethylaminoethyl methacrylate | 480.0 | 156.0 |
| 2-Ethylhexyl acrylate | 2760.0 | — |
| Isobutyl acrylate | 2760.0 | 843.6 |
| First initiator mixture | | — |
| Vazo 67[1] | 90.0 | |
| Toluene | 120.0 | 15.0 |
| Xylene | 120.0 | 45.0 |
| Second initiator mixture | | 45.0 |
| Vazo 67[1] | 30.0 | |
| Xylene | 90.0 | 5.0 |
| Resin properties | | 15.0 |
| % Solids (110° C./1 hour) | 99 | 98 |
| Meq Amine | 0.449 | |
| Hydroxyl Number | 0 | 0.89 |
| Number average molecular weight | 1837 | app.1800[2] |

[1]Available from DuPont.
[2]approximately from results similar to Example 12

Examples 12 and 13

Two copolymers with amine functionality were prepared in a manner similar to that of Example 1 from the components listed in Parts by Weight in Table 6.

Powder Coating Examples

For all of the following Examples A through M of Table 7, the flow additives synthesized in the Example 1 through Example 11 and Comparative Examples I and II were used as components of the powder clearcoat formulations. Each formulation in the examples below are shown in amounts of parts by weight which are the grams of the actual component used in the formulation, and each formulation was processed in the following manner. The components were blended in a Henschel Blender for 30 to 60 seconds. The mixtures were then extruded through a Werner & Pfleider co-rotating twin screw extruder at a temperature of 100° C. to 130° C. The extruded material was then ground and classified to a particle size of 17–27 microns using and ACM11[1] grinder. The finished powders were evaluated for appearance[2] and crater resistant[3] properties by electrostatically spraying onto pre-cured ED5051 (Smooth Black Electrocoated panels supplied by PPG Industries) and curing the panel for 30 minutes at 285° F. (140° C.). The dry film thickness (DFT) is targeted for 2.3 to 3.5 mils.

[1]ACM1 Grinder is an Air Classifying Mill from Micron Powder Systems, Summit, New Jersey.
[2]Appearance Properties=20° Gloss and Haze measured by a BYK Gardner Haze—Gloss Meter. Higher numbers for gloss indicate better performance and lower numbers for Haze indicate better performance. Longwave and Shortwave numbers measured by a BYK Gardner Wavescan Instrument, where lower numbers are for better performance. Distinction of Image (DOI) measured by a HunterLab's Dorigon II where higher numbers indicate better performance.
[3]Crater Resistance is evaluated by introducing an incompatible material, such as another powder coating, at level of approximately 0.1 % by mixing it with the powder being evaluated prior to spraying it onto an ED5051 panel and curing for 30 minutes at 285° F. The cured films are then visually evaluated for crater resistance and rated on the following scale: 1 Rating=Very Poor Crater resistance in which the incompatible material causes massive cratering, 2 Rating=Fair Crater resistance in which the incompatible material cause moderate cratering, 3 Rating=Very Good Crater resistance in which the incompatible material causes no cratering. Ratings of 1.5 and 2.5 can also be given and a rating of 2.5 or better is acceptable.

TABLE 7

Examples A–E

| Components | Example A | Example B | Example C | Example D | Example E |
|---|---|---|---|---|---|
| PD 9060 Polymer A | 2009.5 | 2009.5 | 1607.6 | 1607.6 | 2813.3 |
| Dodecanedioic Acid | 490.5 | 490.5 | 392.4 | 392.4 | 686.7 |
| Flow Additive from Example 1 | 27.5 | — | — | — | |
| Flow Additive from Example 2 | — | 27.5 | — | — | |
| Flow Additive from Example 3 | — | — | 22.0 | — | |
| Flow Additive from Example 4 | — | — | — | 22.0 | — |
| Flow Additive from Example 5 | — | — | — | — | 38.5 |
| Benzoin | 5.5 | 5.5 | 4.4 | 4.4 | 7.7 |
| Micro Wax C | 16.5 | 16.5 | 13.2 | 13.2 | 23.1 |
| TINUVIN 144[B] | 54.8 | 54.8 | 43.8 | 43.8 | 76.7 |
| TINUVIN 900[B] | 54.8 | 54.8 | 43.8 | 43.8 | 76.7 |
| Cyclic organo phosphorous compound[C] | 54.8 | 54.8 | 43.8 | 43.8 | 76.7 |
| Methyl Dicocoamine[D] | 6.8 | 6.8 | 5.4 | 5.4 | 9.5 |
| Triphenyl Tin Hydroxide[E] | 20.5 | 20.5 | 16.4 | 16.4 | 28.7 |

Appearance and Crater Resistance Results

| Property | Example A | Example B | Example C | Example D | Example E |
|---|---|---|---|---|---|
| Clearcoat Dry Film Thickness | 2.3 | 2.6 | 3.3 | 2.9 | 2.6 |
| 20° Gloss | 85 | 86 | 88 | 87 | 87 |
| Haze | 16 | 12 | 14 | 15 | 15 |
| DOI | 95 | 97 | 96 | 96 | 94 |
| Wavescan (Longwave/Shortwave) | 3.4/3.7 | 1.4/3.4 | 4.2/4.6 | 4.4/3.2 | 3.4/4.7 |
| Crater Resistance Rating | 2 | 3 | 2.5 | 3 | 3 |

Examples F–I

TABLE 7-continued

|  | Parts by Weight | | | |
|---|---|---|---|---|
| Components | Example F | Example G | Example H | Example I |
| PD 9060 Polymer[A] | 2009.5 | 2009.5 | 1607.6 | 1607.6 |
| Dodecanedioic Acid | 490.5 | 490.5 | 392.4 | 392.4 |
| Flow Additive from Example 6 | 27.5 | — | — | — |
| Flow Additive from Example 7 | — | 30.3 | — | — |
| Flow Additive from Example 8 | — | — | 22.0 | — |
| Flow Additive from Example 9 | — | — | — | 22.0 |
| Benzoin | 5.5 | 5.5 | 4.4 | 4.4 |
| Micro Wax C | 16.5 | 16.5 | — | 13.2 |
| TINUVIN 144[B] | 54.8 | 54.8 | 43.8 | 43.8 |
| TINUVIN 900[B] | 54.8 | 54.8 | 43.8 | 43.8 |
| Cyclic organo phosphorous compound[C] | 54.8 | 54.8 | 43.8 | 43.8 |
| Methyl Dicocoamine[D] | 6.8 | 6.8 | 5.4 | 5.4 |
| Triphenyl Tin Hydroxide[E] | 20.5 | 20.5 | 16.4 | 16.4 |
| Appearance and Crater Resistance Results | | | | |
| Property | Example F | Example G | Example H | Example I |
| Clearcoat Dry Film Thickness | 2.9 | 2.6 | 2.4 | 2.8 |
| 20° Gloss | 87 | 87 | 87 | 86 |
| Haze | 13 | 14 | 17 | 18 |
| DOI | 97 | 95 | 97 | 96 |
| Wavescan (Longwave/Shortwave) | 3.9/3.4 | 2.4/4.6 | 1.7/3.0 | 0.6/3.7 |
| Crater Resistance Rating | 3 | 2.5 | 2.5 | 2.5 |

Examples J–M

|  | Parts by Weight | | | |
|---|---|---|---|---|
| Components | Example J | Example K | Example L | Example M |
| PD 9060 Polymer[A] | 2009.5 | 2411.4 | 2009.5 | 1607.6 |
| Dodecanedioic Acid | 490.5 | 588.6 | 490.5 | 392.4 |
| Flow Additive from Example 10 | 30.3 | — | — | — |
| Flow Additive from Example 11 | — | 36.3 | — | — |
| Flow Additive from Example I | — | — | 27.5 | — |
| Flow Additive from Example II | — | — | — | 2.0 |
| Benzoin | 5.5 | 6.6 | 5.5 | 4.4 |
| Micro Wax C[F] | 16.5 | 19.8 | 16.5 | 13.2 |
| TINUVIN 144[B] | 54.8 | 65.7 | 54.8 | 43.8 |
| TINUVIN 900[B] | 54.8 | 65.7 | 54.8 | 43.8 |
| Cyclic organo phosphorous compound[C] | 54.8 | 65.7 | 54.8 | 43.8 |
| Methyl Dicocoamine[D] | 6.8 | 8.1 | 6.8 | 5.4 |
| Triphenyl Tin Hydroxide[E] | 20.5 | 24.6 | 20.5 | 16.4 |
| Appearance and Crater Resistance Results | | | | |
| Properties | Example J | Example K | Example L | Example M |
| Clearcoat Dry Film Thickness | 2.8 | 2.8 | 2.6 | 2.4 |
| 20° Gloss | 86 | 86 | 79 | 86 |
| Haze | 15 | 16 | 71 | 15 |
| DOI | 96 | 95 | 96 | 98 |
| Wavescan (Longwave/shortwave) | 1.3/2.8 | 2.0/4.3 | 1.3/4.4 | 1.6/3.0 |
| Crater Resistance Rating | 3 | 2.5 | 1 | 1 |

[A]PD 9060 Polymer available from Anderson Development made in accordance with U.S. Pat. No. 4,042,645.
[B]TINUVIN 144 (2-tert-butyl-2-(4-hydroxy-3-5-di-tert-butylbenzyl)[bis(methyl-2,2,6,6,-tetramethyl-4-piperidinyl)]dipropionate) and TINUVIN 900 (2-(3',5'-bis(1-methyl-1-phenylethyl)-2'-hydroxyphenyl) benzotriazole) are ultraviolet light stabilizers available from Ciba-Geigy Corp.
[C]An anti-yellowing agent from Sanko Chemical Corporation or from International Resources, Inc. Columbia, Maryland 21046 and is 9,10-dihydro-9-oxa-10-phosphaphenanthrene-10-oxide, or 3,4,5,6-dibenzo-1,2-oxaphosphane-2-oxide as a white crystalline powder with a specific gravity of 1.40 at 30° C., and a melting point of 118° C. and a boiling point of about 200° C. at 5 mm Hg.
[D]Is available from Akzo Chemicals Inc., Chicago, Illinois.
[E]Elf Atochem.
[F]Microwax C is a fatty acid amide available from Hoechst and is ethylene bis-stearoylamide.

The results for Examples A through M show that the flow additives synthesized in the Examples 1 through 13 result in powder formulations with good appearance properties. The crater resistance of each formulation correlates to the composition of the flow additive used for that particular formulation. Examples L and M, which are from comparative examples I and II, and not covered by this invention, have very poor crater resistance. Example A, which uses a low level of the amino monomer in the flow additive composition, has fair crater resistance. All other examples exhibit good crater resistance.

As with powder coating examples A thru M, powder coating examples N and O were prepared using the copolymer flow control additives of Examples 12 and 13, respectively. The powder coating was prepared from the following components of Table 8 and the powder coatings were applied to a substrate as coatings and were tested in a manner similar to those of Examples A–M.

TABLE 8

Example N and O

| Components | Parts by Weight | |
|---|---|---|
| | Example N | Example O |
| epoxy functional copolymer[G] | 828.7 | 828.7 |
| Dodecanedioic Acid | 272.0 | 272.0 |
| Flow Additive from Example 12 Amine Value 35 | 13.2 | 0.0 |
| Flow Additive from Example 13 Amine Value 55 | 0.0 | 13.2 |
| Benzoin | 2.4 | 2.4 |
| Micro Wax C[F] | 7.2 | 7.2 |
| TINUVIN 144[B] | 24.0 | 24.0 |
| hydroxyphenyl triazine ultraviolet absorber | 24.0 | 24.0 |
| Cyclic organo phosphorous compound[C] | 24.0 | 24.0 |
| Methyl Dicocoamine[D] | 4.4 | 4.4 |
| Total | 1200.0 | 1200.0 |

Appearance and Crater Resistance Results

| Properties | Example N | Example O |
|---|---|---|
| Clearcoat Dry Film Thickness | 2.2 | 3.3 |
| 20° Gloss | 83 | 84 |
| Haze | 19 | 18 |
| DOI | 94 | 96 |
| Wavescan (Longwave/Shortwave) | 2.2/7.0 | 1.0/4.1 |
| Crater Resistance Rating | 3 | 3 |

[G]Copolymer prepared from the following monomers and their amounts in parts by weight of the monomer components: glycidylmethacrylate 50, styrene 5, butylmethacrylate-10, and methylmethacrylate-35. The preparation can be by the following method. An initial solvent portion of xylene or butyl acetate can be charged into a four-neck flask, which can serve as the reaction vessel, and which can be equipped with a thermocouple, a reflux condenser and a stirrer. The initial solvent charge can be heated to reflux under a nitrogen gas blanket. A "first initiator mixture" can be prepared in a separate premix flask of one of the aforementioned solvents and t-Amyl peroxyacetate or 2,2'-Azobis(2-methylbutyronitrile). Also, the monomer mixture can be prepared in a separate second premix flask. The first initiator mixture and the monomer mixture can be simultaneously added dropwise from separate addition funnels into the reaction vessel over a period of time of three hours while maintaining the reaction at reflux and under a nitrogen gas blanket. After the completion of the additions, the reaction mixture can be held at reflux for 30 minutes. After this period of time, a "second initiator mixture", similar to the first but at lower amounts of the components, which can be premixed, can be added by the addition funnel to the reaction vessel and the reaction can be held at reflux under the nitrogen blanket for one hour. After this period of time, a "third initiator mixture", similar to the first but at lower amounts of the components, can be premixed and added by the addition funnel to the reaction vessel and the reaction can be held at reflux under the nitrogen blanket for one hour after which the reaction mixture can be cooled. The reaction mixture can be vacuum stripped to remove volatile components.
[H] available from Ciba-Geigy Limited, Basel, Switzerland as CGL 1545

Therefore, what is claimed is:

1. A curable coating composition comprising:
   (I) from 80 to 99.99 percent by weight based on solids of the curable coating composition of at least one film-forming resinous material, and
   (II) from 0.01 to 3 percent by weight based on total resin solids of the curable coating composition of a functional, nongelled flow control copolymer having a calculated $T_g$ of less than 0° C., wherein the functionality is selected from the group consisting of amino, and amino and hydroxyl, and wherein the copolymer is selected from the group consisting of:
   (A) copolymer prepared from polymerizing polymerizable ethylenically unsaturated monomers comprising:
   (1) 40 to 99 percent by weight of the copolymer of at least one non-amino, non-hydroxyl and non-acid functional alkyl acrylate or methacrylate containing from 1 to 20 carbon atoms in the alkyl group, and
   (2) functional monomers selected from the group consisting of:
   (a) one or more amino functional monomers selected from the group consisting of amino functional acrylates, amino functional methacrylates and mixtures thereof in an effective amount to give an amine value for the copolymer in the range of about 2 to about 70; and
   (b) one or more amino functional monomers selected from the group consisting of amino functional acrylates, amino functional methacrylates and mixtures thereof in an effective amount to give an amine value for the copolymer in the range of about 2 to about 70 and one or more hydroxyl functional monomers in an effective amount so that the hydroxyl number of the copolymer is from 0 up to 100; and
   (B) copolymer prepared from polymerizing polymerizable ethylenically unsaturated monomers comprising: (A)(1) monomers with an acrylate or methacrylate monomer having precursor functionality and where the copolymer is post-reacted with a compound selected from the group consisting of phosphoric acid so that the acid number of the copolymer is in the range of 10 to 30 and amines so that at least the amine value of the copolymer is in the range of about 2 to about 70.

2. Coating composition of claim 1 wherein the film-forming resinous material is a curable film-forming resinous material selected from the group consisting of liquid and particulate curable film-forming resinous materials.

3. Coating composition of claim 2 wherein the curable film-forming resinous material is a thermosetting powder in the absence of a carrier for the film-forming resinous material.

4. The coating composition of claim 2 in which the curable film-forming resinous material is based on a polyepoxide and a polyacid curing agent.

5. The composition of claim 1 in which the copolymer additionally contains from at least 5 to 30 percent by weight of an alkyl acrylate or methacrylate having a calculated glass transition temperature of less than 0° C.

6. The composition of claim 1 in which the copolymer is prepared by organic solution polymerization techniques.

7. The composition of claim 1 in which the copolymer has a weight average molecular weight of from 1000 to 40,000.

8. The composition of claim 1 in which the(A)(1) monomer of alkyl acrylate or methacrylate containing from 1 to 20 carbon atoms is selected from the group consisting of isodecyl methacrylate, 2-ethylhexyl acrylate, alone and with alkylacrylate wherein the alkyl group has 2 to 4 carbon atoms.

9. The composition of claim 1 wherein the copolymer has the polymerization product of both functional monomers of the (A)(2) monomers in effective amounts so that the amine value of the copolymer is in the range of 6 to 12, and the hydroxyl number of the copolymer is in the range of about 40 to 100.

10. The composition of claim 9 in which the aminoalkyl acrylate or methacrylate is selected from the group consisting of N,N-dimethylaminoethyl methacrylate and N,N-diethylaminoethyl methacrylate.

11. The composition of claim 9 wherein the hydroxyl functional monomer is selected from the group consisting of hydroxyethyl methacrylate, hydroxyethyl acrylate and polycaprolactone diol having: Average Molecular Weight from 530 to 543, Hydroxyl Number in KOH/g of 212 mg., Melting Point Range in ° C. of 30–40, Specific Gravity at 44/20° C. of 1.073, and Viscosity in Centistokes at 85° C. of 88 and mixtures of these hydroxyl functional monomers.

12. The composition of claim 1 in which the copolymer (A) has a weight percentage of the monomers based on the total weight of the monomer to prepare the copolymer of:
  1 to 10 for the amino functional monomer selected from the group consisting of amino functional acrylates and methacrylates to give a copolymer with an amine value in the range of 6–12; and
  1 to 25 hydroxyl functional monomer selected from the group consisting of: hydroxyl functional acrylates and methacrylates so that the copolymer has a hydroxyl number in the range of 40 to 100 when the equivalent weight is around 116.

13. The composition of claim 1 further comprising a carrier selected from the group consisting of: water and organic solvents.

14. The composition of claim 1 in which the film-forming resinous material has at least one component selected from the group consisting of: catalyst, and second film-forming polymer.

15. A curable thermosetting powder coating composition comprising:
  (i) from 80 to 99.99 percent by weight based on solids of the curable coating composition of at least one film-forming resinous material,
  (ii) from 0.01 to 3 percent by weight based on total resin solids of the curable coating composition of a functional, nongelled flow control copolymer having a calculated $T_g$ of less than 0° C. and a weight average molecular weight in the range from 1,000 to 15,000, wherein the functionality is selected from the group consisting of amino, and amino and hydroxyl and the copolymer is selected from the group consisting of:
(A) copolymer prepared from polymerizing polymerizable ethylenically unsaturated monomers comprising:
  (1) 40 to 99 percent by weight of the copolymer of at least one non-amino, non-hydroxyl and non-acid functional alkyl acrylate or methacrylate and mixtures thereof containing from 3 to 20 carbon atoms in the alkyl group, and
  (2) functional monomers selected from the group consisting of:
    (a) at least one amino functional monomer selected from the group consisting of: amino functional acrylate, amino functional methacrylate, and mixtures thereof in an effective amount for 100 percent solids of the copolymer to give an amine value for the copolymer in the range of about 6 to about 55; and
    (b) at least one amino functional monomer selected from the group consisting of: amino functional acrylate, amino functional methacrylate, and mixtures thereof in an effective amount for 100 percent solids of the copolymer to give an amine value for the copolymer in the range of about 6 to about 55 and at least one hydroxyl functional monomer selected from the group consisting of hydroxyalkyl acrylates, hydroxyalkyl methacrylates, polycaprolactone diol monomers and mixtures thereof in an effective amount for 100 percent solids of the copolymer so that the hydroxyl number of the copolymer is from 40 up to 100; and
(B) copolymer prepared from polymerizing polymerizable ethylenically unsaturated monomers comprising: one or more (A)(1) monomer with a phosphoric acid reactable functional monomer selected from the group consisting of glycidyl acrylate and glycidyl methacrylate and mixtures thereof, where the copolymer is post reacted with phosphoric acid so that the acid number of the copolymer is in the range of 10 to 30.

* * * * *

UNITED STATES PATENT AND TRADEMARK OFFICE
CERTIFICATE OF CORRECTION

PATENT NO. : 6,013,733
DATED : January 11, 2000
INVENTOR(S) : Singer et al.

It is certified that error appears in the above-identified patent and that said Letters Patent are hereby corrected as shown below:

IN THE ABSTRACT:

Please insert after "100." on the last line the following sentence --The copolymer flow modifiers enhance the rheology of the curable film-forming resinous material like thermosetting powder coating compositions to provide for smoother coatings while at the same time not adversely affecting appearance or adhesion with associated coatings, for example, basecoats when the coating composition is a clearcoat.--

Signed and Sealed this

Eighth Day of May, 2001

*Attest:*

NICHOLAS P. GODICI

*Attesting Officer*   Acting Director of the United States Patent and Trademark Office